US011732752B2

(12) United States Patent
Petronic et al.

(10) Patent No.: US 11,732,752 B2
(45) Date of Patent: Aug. 22, 2023

(54) BEARING UNIT FOR A ROTOR UNIT OF A WIND TURBINE AND WIND TURBINE

(71) Applicant: Siemens Gamesa Renewable Energy A/S, Brande (DK)

(72) Inventors: Vujadin Petronic, Brande (DK); Søren Poulsen, Holstebro (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/567,972

(22) Filed: Jan. 4, 2022

(65) Prior Publication Data

US 2022/0228626 A1 Jul. 21, 2022

(30) Foreign Application Priority Data

Jan. 19, 2021 (EP) ..................................... 21152256

(51) Int. Cl.
*F16C 19/36* (2006.01)
*F16C 33/78* (2006.01)

(52) U.S. Cl.
CPC ........ *F16C 19/361* (2013.01); *F16C 33/7823* (2013.01); *F16C 2360/31* (2013.01)

(58) Field of Classification Search
CPC .. F16C 19/361; F16C 33/7803; F16C 33/782; F16C 33/7823; F16C 33/7826; F16C 33/783; F16C 33/7869; F16C 33/7896; F16C 2300/14; F16C 2360/31; F16J 15/3208; F16J 15/3232; F16J 15/3236; F03D 80/00; F03D 80/70; Y02E 10/72
See application file for complete search history.

(56) References Cited

U.S. PATENT DOCUMENTS

| 2010/0247295 | A1* | 9/2010 | Hofmann | F03D 80/70 384/571 |
| 2011/0103728 | A1* | 5/2011 | Cowles | F16C 33/76 277/351 |
| 2012/0068413 | A1 | 3/2012 | Putt et al. | |

FOREIGN PATENT DOCUMENTS

| CN | 107191599 A | * | 9/2017 | .......... F15B 15/1452 |
| CN | 107917137 A | | 4/2018 | |

(Continued)

OTHER PUBLICATIONS

Machine Translation of CN-107191599-A (Year: 2017).*
Machine Translation of WO-2014016017-A1 (Year: 2014).*
Machine Translation of WO-2009143972-A1 (Year: 2009).*

*Primary Examiner* — Alan B Waits
(74) *Attorney, Agent, or Firm* — Schmeiser, Olsen & Watts LLP

(57) ABSTRACT

Provided is a bearing unit for a rotor unit of a wind turbine, including a first bearing ring, a second bearing ring, a plurality of rolling elements and a sealing member including a sealing member base portion, a first sealing member tip portion and a second sealing member tip portion, wherein the first sealing member tip portion abuts a first wall of the first bearing ring and the second sealing member tip portion abuts a second wall of the bearing unit, wherein the sealing member is configured and arranged such that a first contact pressure between the first sealing member tip portion) and the first wall is transmitted through the sealing member to the second sealing member tip portion to increase a second contact pressure between the second sealing member tip portion and the second wall. Also provided is a wind turbine.

16 Claims, 3 Drawing Sheets

(56) References Cited

FOREIGN PATENT DOCUMENTS

| | | | |
|---|---|---|---|
| DE | 102009035739 A1 | 2/2011 | |
| DE | 102010019442 A1 | 11/2011 | |
| EP | 2431625 A2 | 3/2012 | |
| EP | 3236096 A1 | 10/2017 | |
| GB | 1326332 A | 8/1973 | |
| JP | 2012112488 A | 6/2012 | |
| WO | WO-2009143972 A1 * | 12/2009 | ............... F16C 33/78 |
| WO | WO 2011050837 A1 | 5/2011 | |
| WO | WO 2011050838 A1 | 5/2011 | |
| WO | WO 2011159867 A1 | 12/2011 | |
| WO | WO-2014016017 A1 * | 1/2014 | ............ F16C 19/386 |

\* cited by examiner

BEARING UNIT FOR A ROTOR UNIT OF A WIND TURBINE AND WIND TURBINE

CROSS-REFERENCE TO RELATED APPLICATIONS

This application claims priority to EP Application No. 21152256.0, having a filing date of Jan. 19, 2021, the entire contents of which are hereby incorporated by reference.

FIELD OF TECHNOLOGY

The following is directed to a bearing unit for a rotor unit of a wind turbine. Furthermore, the following is directed to a wind turbine comprising a bearing unit.

BACKGROUND

Common wind turbines comprise a rotor unit with a plurality of rotor blades and a rotor shaft, a transmission unit for transmitting a low rotational speed of the rotor shaft into a high rotational speed of a high-speed shaft and a generator unit for generating electricity from the rotational movement of the high-speed shaft. The rotor unit is pivot-mounted to a housing unit of the wind turbine by a bearing unit, wherein the transmission unit and the generator unit are located within the housing unit. The housing unit is also denoted as "nacelle".

The bearing unit is usually configured as roller bearing with an inner bearing ring, an outer bearing ring and a set of rolling elements arranged within a free space between the inner bearing ring and the outer bearing ring. The rolling elements may be cylindrically shaped and angularly arranged with respect to a rotational axis of the bearing unit. To ensure less friction and wear out, a lubricant, such as grease or the like, is provided within the free space.

To avoid grease leakage as well as pollution of the grease, a sealing member for sealing one side of the free space towards an environment of the bearing unit is provided. Such sealing members are normally configured as radial shaft sealing member. The sealing member has a grease side, facing the grease and an environment side, facing the environment of the bearing unit.

Generally, the sealing member is clamped to the outer bearing ring, wherein a first sealing lip is in close contact with the inner bearing ring. Moreover, such sealing members may comprise a second sealing lip, spaced apart from the first sealing lip on the environment side of the first sealing lip and contacting the inner bearing ring as well. The contact pressure of the second sealing lip is usually solely provided by the material of the second sealing lip.

To ensure sufficient contact pressure between the first sealing lip and the inner bearing ring, a spring member, especially a garter spring, is provided at the first sealing lip. The garter spring is located on the grease side of the first sealing lip within a circumferential groove of the first sealing lip.

Common bearing units have several setbacks. Firstly, the garter spring is hard to assemble, since it is located on the grease side of the sealing member. Secondly, correct placement of the garter spring is hard to control when the sealing member is already in an assembled state. Thirdly, during operation the garter spring may slip out of the groove of the first sealing lip due to bad assembly, material failure, wear out or the like. As a result, the first sealing lip and the inner bearing ring may lose mutual contact pressure. Thus, the sealing member can lose its leak tightness and the bearing unit can be damaged very easily.

SUMMARY

An aspect relates to a bearing unit for a rotor unit of a wind turbine and a wind turbine, which do not have the setbacks of the state in the art solutions. In particular, it is an aspect of the present invention to provide a bearing unit and a wind turbine, which are easier to assemble and/or have a reduced risk of grease leakage due to sealing member failure.

According to a first aspect of embodiments of the invention, the problem is solved by a bearing unit for a rotor unit of a wind turbine. The bearing unit comprises a first bearing ring for being mounted to a first rotor unit component of the rotor unit, a second bearing ring for being mounted to a second rotor unit component of the rotor unit, a plurality of rolling elements being located within a free space between the first bearing ring and the second bearing ring for supporting a relative rotating action between the first bearing ring and the second bearing ring around a rotational axis of the bearing unit and a sealing member for sealing one side of the free space towards an environment of the bearing unit, preferably by contacting the first bearing ring and the second bearing ring. The sealing member comprises a sealing member base portion and a first sealing member tip portion protruding from the sealing member base portion in the direction of the first bearing ring. According to embodiments of the invention, the sealing member comprises a second sealing member tip portion protruding from the sealing member base portion in the direction of the first bearing ring. The first sealing member tip portion abuts a first wall of the first bearing ring and the second sealing member tip portion abuts a second wall of the bearing unit, wherein the second wall faces the first wall. The sealing member is configured and arranged such that a first contact pressure between the first sealing member tip portion and the first wall is transmitted through the sealing member, preferably through the sealing member base portion, to the second sealing member tip portion to increase a second contact pressure between the second sealing member tip portion and the second wall.

The bearing unit is configured as roller bearing unit with the standard components of the first bearing ring, the second bearing ring and the rolling elements. By means of the rolling elements, a rotational movement between the first bearing ring and the second bearing ring around the rotational axis is ensured. Since the first bearing ring is configured for being mounted to the first rotor unit component and the second bearing ring is configured for being mounted to the second rotor unit component, the bearing unit is configured for pivot arrangement of the first rotor unit component to the second rotor unit component.

For preventing grease leakage and pollution of the grease due to environmental influence, such as water, dust or the like, the bearing unit comprises the sealing member. In an embodiment, the bearing unit comprises at least one sealing member on every open side of the free space towards the environment. Therefore, it is preferred that the bearing unit comprises two or at least two sealing members. In an embodiment, the sealing member is coaxially arranged with respect to the rotational axis.

The sealing member comprises the sealing member base portion, which is configured for being clamped to the second bearing ring. Therefore, it is preferred that the sealing member base portion is made of full material to ensure sufficient clamping force. Additionally, or alternatively, the cross section of the sealing member base portion can comprise pores, passages or the like. In an embodiment, the cross section of the sealing member base portion is rectangular or at least substantially rectangular. According to embodiments of the invention, substantially rectangular means rectangular with at least one divergence from the rectangular shape, such as a curve, edge or the like. The sealing member base portion can be trapezoid, wherein a basis of the trapezium is facing away from the first sealing member tip portion. According to embodiments of the invention, the sealing member can be clamped to the second bearing ring directly or by a mounting unit, which is fixedly attached to the second bearing ring, by screws, bolts or the like.

The first sealing member tip portion and the second sealing member tip portion are protruding each from the sealing member base portion in the direction of the first bearing ring. It is preferred that, in an unstressed state, e. g. before the sealing member is assembled within the bearing unit, the first sealing member tip portion and the second sealing member tip portion are arranged divergent, starting from the sealing member base portion. It is further preferred that, in a stressed state, when the sealing member is assembled within the bearing unit, the first sealing member tip portion and the second sealing member tip portion are arranged parallel or at least substantially parallel. It is preferred, that the first wall is parallel or at least substantially parallel to the second wall. In an embodiment, the first sealing member tip portion and the second sealing member tip portion are configured such that they form a u-shape or v-shape.

According to embodiments of the invention, the first sealing member tip portion and the second sealing member tip portion are mechanically interconnected with each other in a way that a side force against the first sealing member tip portion is transmitted to the second sealing member tip portion and the other way around. With other words, the first sealing member tip portion and the second sealing member tip portion constitute a force-transmitting unit, like a spring member. In an embodiment, the sealing member base portion is part of this force-transmitting unit.

Additionally, or alternatively, an extra force-transmitting unit for transmitting such force can be integrated within the sealing member. Thus, the sealing unit is configured for providing sufficient contact pressure between the first sealing member tip portion and the first wall as well as between the second sealing member tip portion and the second wall. An additional garter spring is not needed and, therefore, cannot be badly located and/or fall off. The sealing member comprises HNBR, NBR and/or PUR.

A bearing unit according to embodiments of the invention has the advantage over standard bearing units for rotor units for wind turbines that the sealing unit is easier to install, correct placement of the sealing unit is easier to determine and the likelihood of grease leakage due to loss of contact pressure is significantly reduced. Moreover, the sealing member of the bearing unit provides proper sealing properties in axial and radial direction, wherein sealing member of standard bearing units provide proper sealing properties in radial direction only.

According to an embodiment of the invention, the sealing member base portion is clamped to the second bearing ring by a clamping plate. It is preferred that the sealing member base portion is arranged at a shoulder part of the second bearing ring. The clamping plate is mounted to the second bearing ring by screws, bolts or the like. In an embodiment, the clamping force is limited by an axial width of the shoulder part. By these means, the maximum clamping force is achievable when the clamping plate is contacting the shoulder part of the second bearing ring. This has the advantage that assembly of the sealing member is improved. Thus, production costs of the bearing unit can be reduced. Moreover, maintenance is improved, since the sealing member can be easily replaced by removing the clamping plate.

It is preferred that the first sealing member tip portion and the second sealing member tip portion are protruding into a first groove of the first bearing ring and the sealing member base portion is fixedly attached to the second bearing ring, wherein the first wall is a first side wall of the first groove and the second wall is a second side wall of the first groove. In other words, the first sealing member tip portion and the second sealing member tip portion both protrude into the groove of the first bearing ring and contact opposite sidewalls of the groove for providing proper sealing. In an embodiment, the sealing member is assembled to the first bearing ring such that the first sealing member tip portion and the second sealing member tip portion are bent towards each other to fit into the groove, wherein the groove has a width that tension between the first wall and the first sealing member tip portion and between the second wall and the second sealing member tip portion is established. In an embodiment, an opening of the first groove is chamfered to improve assembly of the sealing member into the first groove. It is further preferred that the sealing member base portion is fitted into a second groove of the second bearing ring, especially in a press fit configuration. In an embodiment, an opening of the second groove is chamfered to improve assembly of the sealing member into the second groove. This has the advantage that the sealing effect of the sealing member is improved. Moreover, the sealing member is easy to assemble.

Advantageously, the second wall is provided by the clamping plate. The clamping plate can be fixed to the first bearing ring or the second bearing ring. In other words, according to a first embodiment, the first sealing member tip portion is in contact with the first wall of the first bearing ring and the second sealing member tip portion is in contact with the second wall of a clamping plate, which is fixedly attached to the first bearing ring. In this case, both sealing member tip portions contact a section of the bearing unit, which has the same movement relatively to the second bearing ring. According to a second embodiment, the first sealing member tip portion is in contact with the first wall of the first bearing ring and the second sealing member tip portion is in contact with the second wall of the clamping plate, which is fixedly attached to the second bearing ring. In this embodiment only the first sealing member tip portion is in contact with a section of the bearing unit, which moves relatively to the second bearing ring and the second sealing member tip portion. In this embodiment, it is preferred that the first bearing ring is configured as an outer ring of the bearing unit and the second bearing ring is configured as an inner ring of the bearing unit. This has the advantage that assembly of the sealing member is improved.

It is preferred that at a gap between the clamping plate and the first bearing ring a lip seal is provided for sealing the gap. In an embodiment, a bottom end of the lip seal is attached to the clamping plate, especially clamped within a third groove of the clamping plate. In an embodiment, the third groove is located at a short side of the clamping plate, which extends circumferentially and axially with respect to the rotational axis. It is further preferred that a tip end of the lip seal contacts a face side of the first bearing ring. This has the advantage that sealing of the free space is further improved.

According to an embodiment of the invention, the first bearing ring is configured as an inner ring of the bearing unit and the second bearing ring is configured as an outer ring of the bearing unit. Thus, the sealing member is attached to the outer ring of the bearing unit, wherein the first sealing member tip portion and the second sealing member tip portion both protrude in direction of the rotational axis. The first wall is part of the inner ring. In operation, the outer ring rotates relatively to the sealing member. This configuration is advantageous for special types of wind turbines with a hollow rotor and a fixed rotor shaft.

It is preferred that the first sealing member tip portion comprises a first tip main section, starting adjacent to the sealing member base portion and ending at a first tip end section, wherein the first tip end section has a greater width and/or comprises a less flexible material than the adjacent part of the first tip main section. In an embodiment, the first tip main section has a constantly decreasing width from the sealing member base portion to the first tip end section. It is further preferred that the width of the first tip end section adjacent the first tip main section has at least double the size than the adjacent first tip main section. In an embodiment, the first tip end section comprises reinforcement, such as a protective layer and/or an embedded reinforcement fiber or the like. In an embodiment, the flexibility of the first tip end section is less than the flexibility of the adjacent first tip main section. A preferred material for the first tip end section and/or the first tip main section is PTFE or the like. Additionally, or alternatively, the second sealing member tip portion can be configured likewise. This has the advantage that lifespan and, therefore, the sealing effect of the sealing member can be increased.

It is further preferred that the first wall comprises a first shaped section, wherein the first tip end section is in contact with the first shaped section. Alternatively, or additionally, the second wall comprises a second shaped section, wherein a second tip end section of the second sealing member tip portion is in contact with the second shaped section. According to embodiments of the invention, a shaped section comprises at least one shape different from a flat plane. A preferred shaped section comprises a round, elliptical, rectangular, trapezoid or the like cross section. The shaped section can be configured as bump, dent, ramp, socket or the like. It is further preferred that edges of the shaped section are rounded to prevent pollution and/or damage of the sealing member. In an embodiment, the first shaped section is configured such that the first tip main section is spaced apart from the first wall or at least partly spaced apart from the first wall. In an embodiment, the second shaped section is configured such that a second tip main section of the second sealing member tip portion is spaced apart from the second wall or at least partly spaced apart from the second wall. It is preferred that the bearing unit is configured such that most of a contact force between the first sealing member tip portion and the first wall is transmitted via the first tip end section and/or that most of a contact force between the second sealing member tip portion and the second wall is transmitted via the second tip end section. A shaped section has the advantage that the sealing effect of the sealing member is improved.

In an embodiment, the sealing member comprises an integrated spring member, wherein the spring member extends from the first sealing member tip portion to the second sealing member tip portion. In an embodiment, the spring member extends from the first sealing member tip portion through the sealing member base portion to the second sealing member tip portion. It is preferred that the spring member ends in or next to the first tip end section and/or in or next to the second tip end section. In other words, the spring member can end adjacent to the one or both tip end sections. The spring member is configured to provide a counterforce when the first tip end section and the second tip end section are pressed towards each other. It is preferred that the spring member has a u-shaped cross section. Further preferred, the spring member comprises or consists of stainless steel. A spring member has the advantage that additional contact force between the sealing member and the first wall and the second wall is provided. This, the sealing effect of the sealing member is improved.

According to a second aspect of embodiments of the invention, the problem is solved by a wind turbine. The wind turbine comprises a rotor unit with at least two rotor blades and a rotor shaft, a generator unit for generating electricity from a movement of the rotor unit and a bearing unit arranged at the rotor shaft. According to embodiments of the invention, the bearing unit is configured as a bearing unit according to the first aspect of embodiments of the invention. In an embodiment, the rotor shaft is fixed to the outer bearing ring of the bearing unit. Further preferred, the inner bearing ring is fixedly mounted to a housing of the wind turbine. It is preferred that the rotor unit comprises three rotor blades, wherein adjacent rotor blades constitute an angle of 120°. Further preferred, the wind turbine comprises a foundation and a tower, wherein a bottom end of the tower is fixedly attached to the foundation and the housing is rotatable attached to a top end of the tower.

A wind turbine according to the second aspect of embodiments of the invention has the same advantages than a bearing unit according to the first aspect of embodiments of the invention. Therefore, the wind turbine according to embodiments of the invention has the advantage over common wind turbines that the sealing unit of the bearing unit is easier to install, the correct placement of the sealing unit is easier to determine and the likelihood of grease leakage due to loss of contact pressure is significantly reduced. Moreover, the sealing member of the bearing unit provides proper sealing properties in axial and radial direction, wherein sealing member of standard bearing units provide proper sealing properties in radial direction only. Thus, wear out of the rotor unit of the wind turbine is reduced, wherein mountability and reliability of the rotor unit is improved. Moreover, maintenance of the rotor unit of the wind turbine is improved as well.

BRIEF DESCRIPTION

Some of the embodiments will be described in detail, with reference to the following figures, wherein like designations denote like members, wherein.

DETAILED DESCRIPTION

Figure 1:
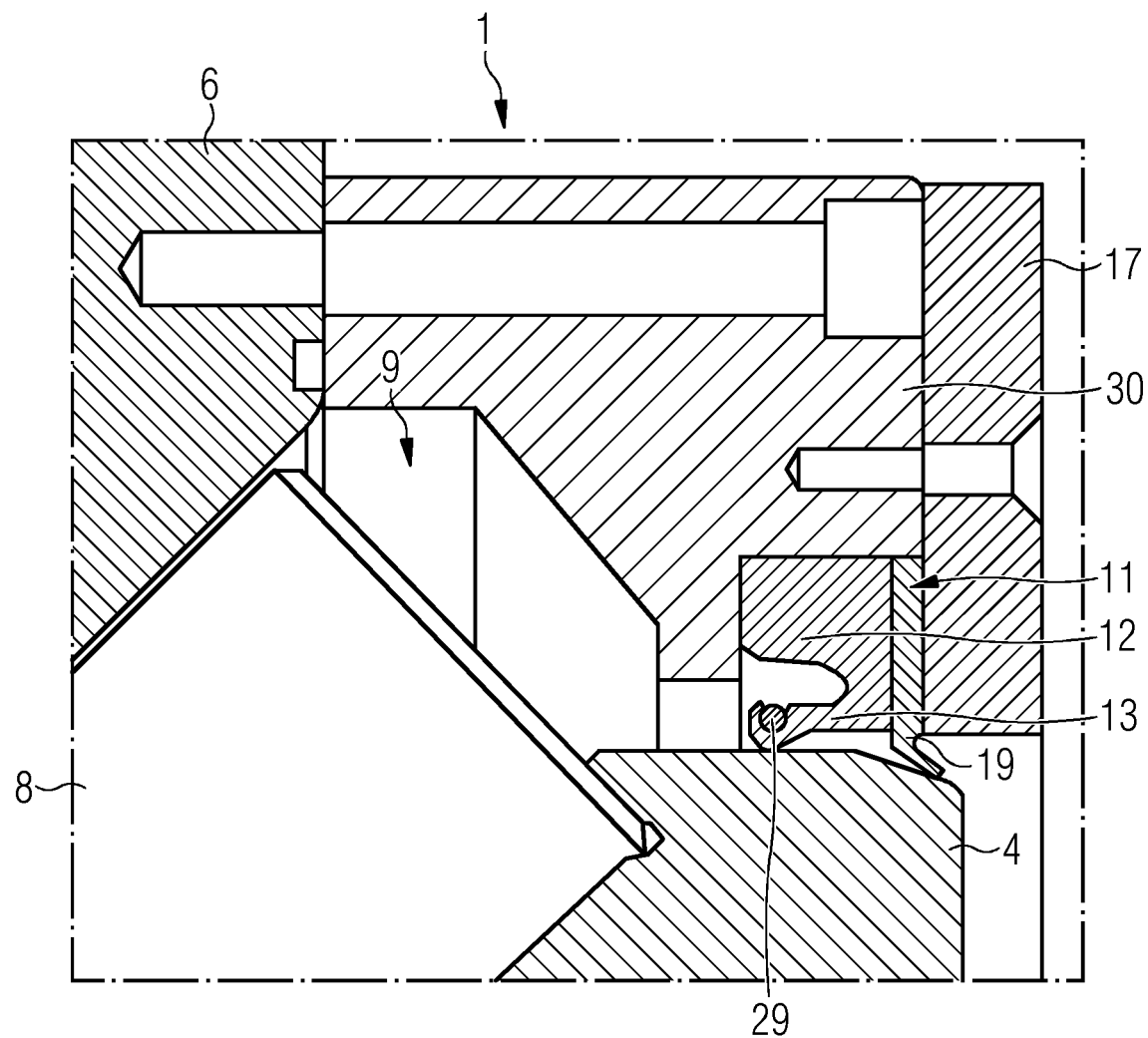
FIG. 1 shows a schematic sectional side view of a conventional bearing unit.

In FIG. 1, a bearing unit 1 according to the conventional art is shown in a schematic sectional side view. The bearing unit 1 comprises a first bearing ring 4 configured as an inner ring of the bearing unit 1, a second bearing ring 6 configured as an outer ring of the bearing unit 1 and a plurality of rolling elements 8 located within a free space 9 between the first bearing ring 4 and the second bearing ring 6. The bearing unit 1 further comprises a sealing member 11, clamped to a mounting unit 30 by a clamping plate 17. The mounting unit 30 is fixed to the second bearing ring 6 and the clamping plate 17 is fixed to the mounting unit 30 by screws.

The sealing member 11 comprises a sealing member base portion 12, which is clamped between the mounting unit 30 and the clamping plate 17, a first sealing member tip portion 13 and a lip seal 19. The first sealing member tip portion 13 is pressed against the first bearing ring 4 by a garter spring 29. The lip seal 19 is in contact with the first bearing ring 4. The first sealing member tip portion 13 is located in between the rolling elements 8 and the lip seal 19.

Figure 2:
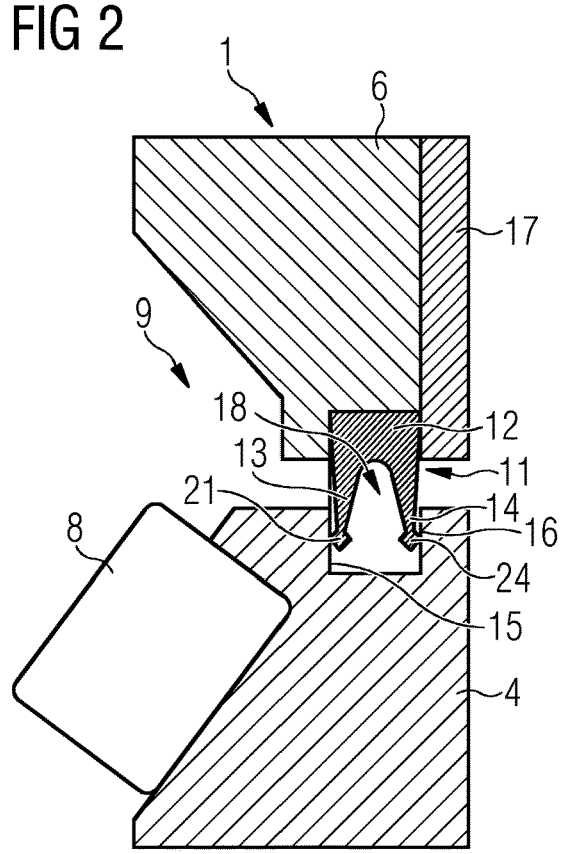
FIG. 2 shows a schematic sectional side view of a bearing unit according to a first d embodiment of the invention.

FIG. 2 shows a bearing unit 1 according to a first preferred embodiment of the invention in a schematic sectional side view. The bearing unit 1 comprises a first bearing ring 4 configured as an inner ring of the bearing unit 1, a second bearing ring 6 configured as an outer ring of the bearing unit 1 and a plurality of rolling elements 8 located within a free space 9 between the first bearing ring 4 and the second bearing ring 6. The bearing unit 1 further comprises a sealing member 11, clamped to the second bearing ring 6 by a clamping plate 17. The clamping plate 17 is fixed to the second bearing ring 6 by screws.

The sealing member 11 comprises a sealing member base portion 12, a first sealing member tip portion 13 with a first tip end section 21 and a second sealing member tip portion 14 with a second tip end section 24. The first tip end section 21 is in contact with a first wall 15 of a first groove 18 of the first bearing ring 4. The second tip end section 24 is in contact with a second wall 16 of the first groove 18, wherein the second wall 16 is facing the first wall 15. Thus, the first sealing member tip portion 13 and the second sealing member tip portion 14 are bent towards each other.

Figure 3:
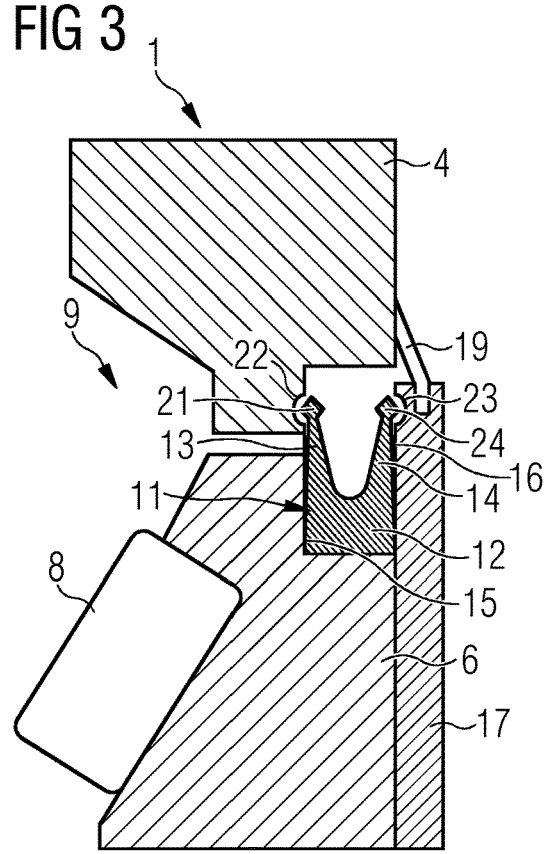
FIG. 3 shows a schematic sectional side view of a bearing unit according to a second embodiment of the invention.

FIG. 3 shows a bearing unit 1 according to a second preferred embodiment of the invention in a schematic sectional side view. The bearing unit 1 comprises a first bearing ring 4 configured as an outer ring of the bearing unit 1, a second bearing ring 6 configured as an inner ring of the bearing unit 1 and a plurality of rolling elements 8 located within a free space 9 between the first bearing ring 4 and the second bearing ring 6. The bearing unit 1 further comprises a sealing member 11, clamped to the second bearing ring 6 by a clamping plate 17. The clamping plate 17 is fixed to the second bearing ring 6 by screws.

The sealing member 11 comprises a sealing member base portion 12, a first sealing member tip portion 13 with a first tip end section 21 and a second sealing member tip portion 14 with a second tip end section 24. The first tip end section 21 is in contact with a first shaped section 22 of a first wall 15 of a recess of the first bearing ring 4. The second tip end section 24 is in contact with a second shaped section 23 of a second wall 16 of the clamping plate 17, wherein the second wall 16 is facing the first wall 15. Thus, the first sealing member tip portion 13 and the second sealing member tip portion 14 are bent towards each other.

Figure 4:
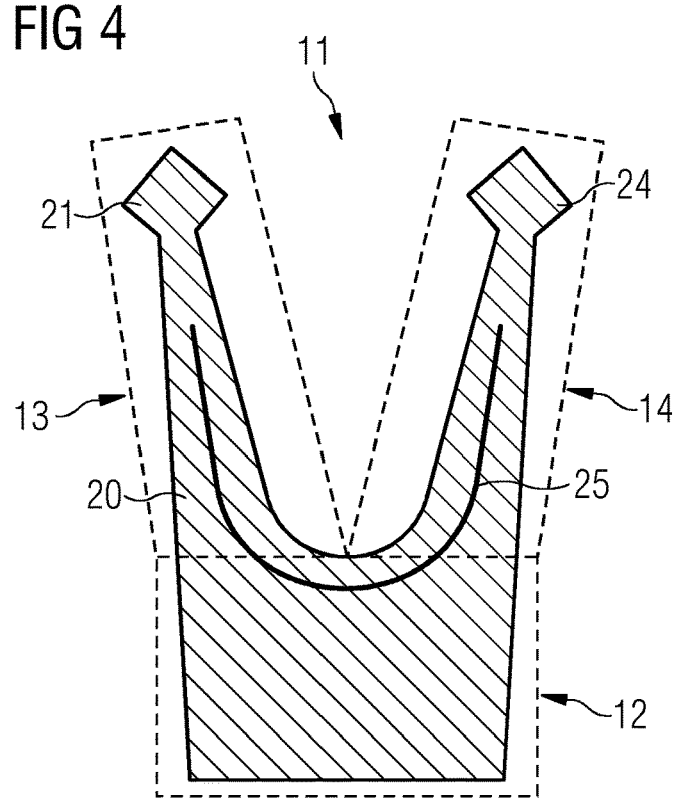
FIG. 4 shows a schematic sectional side view of a sealing unit according to embodiments of the invention.

In FIG. 4, a sealing member 11 according to the invention is shown in a schematic sectional side view. The sealing member 11 can be the same sealing member 11 as shown with respect to the preferred embodiments of FIG. 2 and FIG. 3. The sealing member 11 comprises a u-shaped spring member 25, extending from a section of the first sealing member tip portion 13 near the first tip end section 21 through the sealing member base portion 12 to a section of the second sealing member tip portion 14 near the second tip end section 24. In the illustrated state, the spring member 25 is in an unstressed condition. By the spring member 25 a force introduced to the first tip end section 21 is transmitted to the second tip end section 24.

Figure 5:
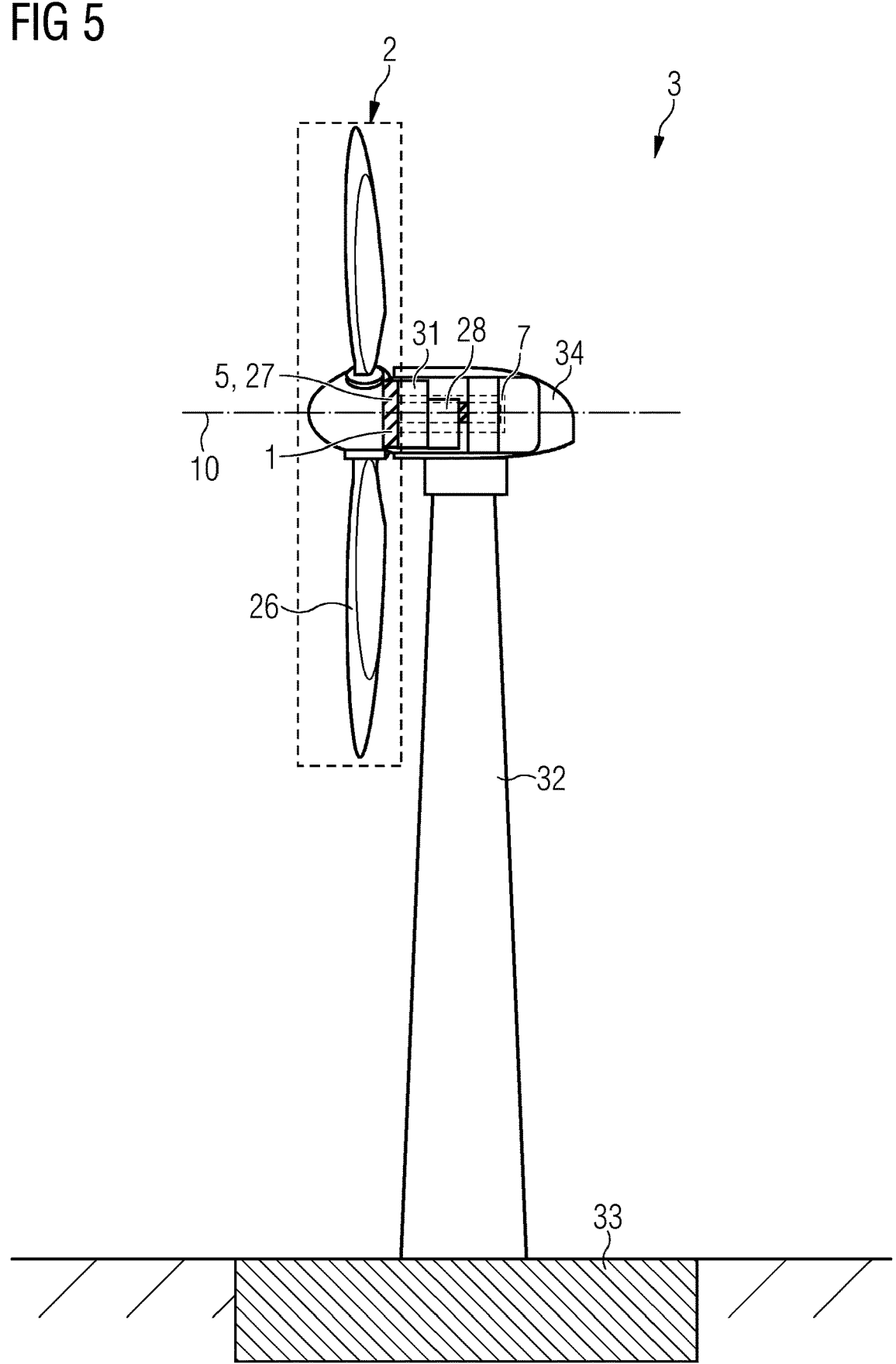
FIG. 5 shows a schematic side view of a wind turbine according to an embodiment of the invention.

FIG. 5 shows a wind turbine 3 according to a preferred embodiment of the invention in a schematic side view. The wind turbine 3 comprises a tower 32, based on a foundation 33. On the tower 32, a housing 34 of the wind turbine 3 is pivotable arranged for rotation about a vertical axis. Within the housing 34, a rotor unit 2 of the wind turbine 3 with a rotatable first rotor unit component 5, configured as rotor shaft 27, a second rotor unit component 7 fixed to the housing 34 and a bearing unit 1 according to the invention to pivot the first rotor unit component 5 at the second rotor unit component 7 about a rotational axis 10. Rotor blades 26 of the wind turbine 3 are attached to the first rotor unit component 5. For transforming low rotational speed of the first rotor unit component 5 into high rotational speed, the wind turbine 3 comprises a gear unit 31. For generating electricity, the wind turbine 3 further comprises a generator unit 28.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A bearing unit for a rotor unit of a wind turbine, comprising:
 a first bearing ring for being mounted to a first rotor unit component of the rotor unit;
 a second bearing ring for being mounted to a second rotor unit component of the rotor unit;
 a plurality of rolling elements being located within a free space between the first bearing ring and the second bearing ring for supporting a relative rotating action between the first bearing ring and the second bearing ring around a rotational axis of the bearing unit; and
 a sealing member for sealing one side of the free space towards an environment of the bearing unit, wherein the sealing member comprises a sealing member base portion and a first sealing member tip portion protruding from the sealing member base portion in the direction of the first bearing ring,
 wherein the sealing member comprises a second sealing member tip portion protruding from the sealing member base portion, the first sealing member tip portion abuts a first wall of the first bearing ring and the second sealing member tip portion abuts a second wall of the bearing unit, the second wall facing the first wall;
 wherein the sealing member is configured and arranged such that a first contact pressure between the first sealing member tip portion and the first wall is transmitted through the sealing member to the second sealing member tip portion to increase a second contact pressure between the second sealing member tip portion and the second wall;
 wherein the sealing member comprises a spring member integrated within the sealing member, the spring member extending from the first sealing member tip portion to the second sealing member tip portion through the sealing member base portion.

2. The bearing unit according to claim 1, wherein the sealing member base portion is clamped to the second bearing ring by a clamping plate.

3. The bearing unit according to claim 2, wherein the second wall is provided by the clamping plate.

4. The bearing unit according to claim 3, wherein at a gap between the clamping plate and the first bearing ring, a lip seal is provided for sealing the gap.

5. The bearing unit according to claim 1, wherein the first sealing member tip portion and the second sealing member tip portion are protruding into a first groove of the first bearing ring and the sealing member base portion is fixedly attached to the second bearing ring, further wherein the first wall is a first side wall of the first groove and the second wall is a second side wall of the first groove.

6. The bearing unit according to claim 1, wherein the first bearing ring is an inner ring of the bearing unit and the second bearing ring is an outer ring of the bearing unit.

7. The bearing unit according to claim 1, wherein the first sealing member tip portion comprises a first tip main section, starting adjacent to the sealing member base portion and ending at a first tip end section, and the first tip end section has a greater width and/or comprises a less flexible material than the adjacent part of the first tip main section.

8. The bearing unit according to claim 7, wherein the first wall comprises a first shaped section, the first tip end section being in contact with the first shaped section and/or the second wall comprises a second shaped section, wherein a second tip end section is in contact with the second shaped section.

9. A wind turbine comprising:
a rotor unit with at least two rotor blades and a rotor shaft;
a generator unit for generating electricity from a movement of the rotor unit; and
a bearing unit according to claim 1, arranged at the rotor shaft.

10. The bearing unit according to claim 1, wherein the spring member is integrated into the sealing member such that the spring member avoids contact with the first wall and the second wall.

11. A bearing unit for a rotor unit of a wind turbine, comprising:
a first bearing ring for being mounted to a first rotor unit component of the rotor unit;
a second bearing ring for being mounted to a second rotor unit component of the rotor unit;
a plurality of rolling elements being located within a free space between the first bearing ring and the second bearing ring for supporting a relative rotating action between the first bearing ring and the second bearing ring around a rotational axis of the bearing unit; and
a sealing member for sealing one side of the free space towards an environment of the bearing unit, wherein the sealing member comprises a sealing member base portion and a first sealing member tip portion protruding from the sealing member base portion in the direction of the first bearing ring,
wherein the sealing member comprises a second sealing member tip portion protruding from the sealing member base portion, the first sealing member tip portion abuts a first wall of the first bearing ring and the second sealing member tip portion abuts a second wall of the bearing unit, the second wall facing the first wall;
wherein the sealing member is configured and arranged such that a first contact pressure between the first sealing member tip portion and the first wall is transmitted through the sealing member to the second sealing member tip portion to increase a second contact pressure between the second sealing member tip portion and the second wall;
wherein the sealing member base portion is clamped to the second bearing ring by a clamping plate, and the second wall is provided by the clamping plate.

12. The bearing unit according to claim 11, wherein the first sealing member tip portion and the second sealing member tip portion are protruding into a first groove of the first bearing ring and the sealing member base portion is fixedly attached to the second bearing ring, further wherein the first wall is a first side wall of the first groove and the second wall is a second side wall of the first groove.

13. The bearing unit according to claim 11, wherein the first bearing ring is an inner ring of the bearing unit and the second bearing ring is an outer ring of the bearing unit.

14. The bearing unit according to claim 11, wherein the first sealing member tip portion comprises a first tip main section, starting adjacent to the sealing member base portion and ending at a first tip end section, and the first tip end section has a greater width and/or comprises a less flexible material than the adjacent part of the first tip main section.

15. The bearing unit according to claim 14, wherein the first wall comprises a first shaped section, the first tip end section being in contact with the first shaped section and/or the second wall comprises a second shaped section, wherein a second tip end section is in contact with the second shaped section.

16. A wind turbine comprising:
a rotor unit with at least two rotor blades and a rotor shaft;
a generator unit for generating electricity from a movement of the rotor unit; and
a bearing unit according to claim 11, arranged at the rotor shaft.

* * * * *